Oct. 22, 1940.   A. O. WILLIAMS   2,219,142
UNIVERSAL JOINT CONSTRUCTION
Filed Aug. 25, 1938
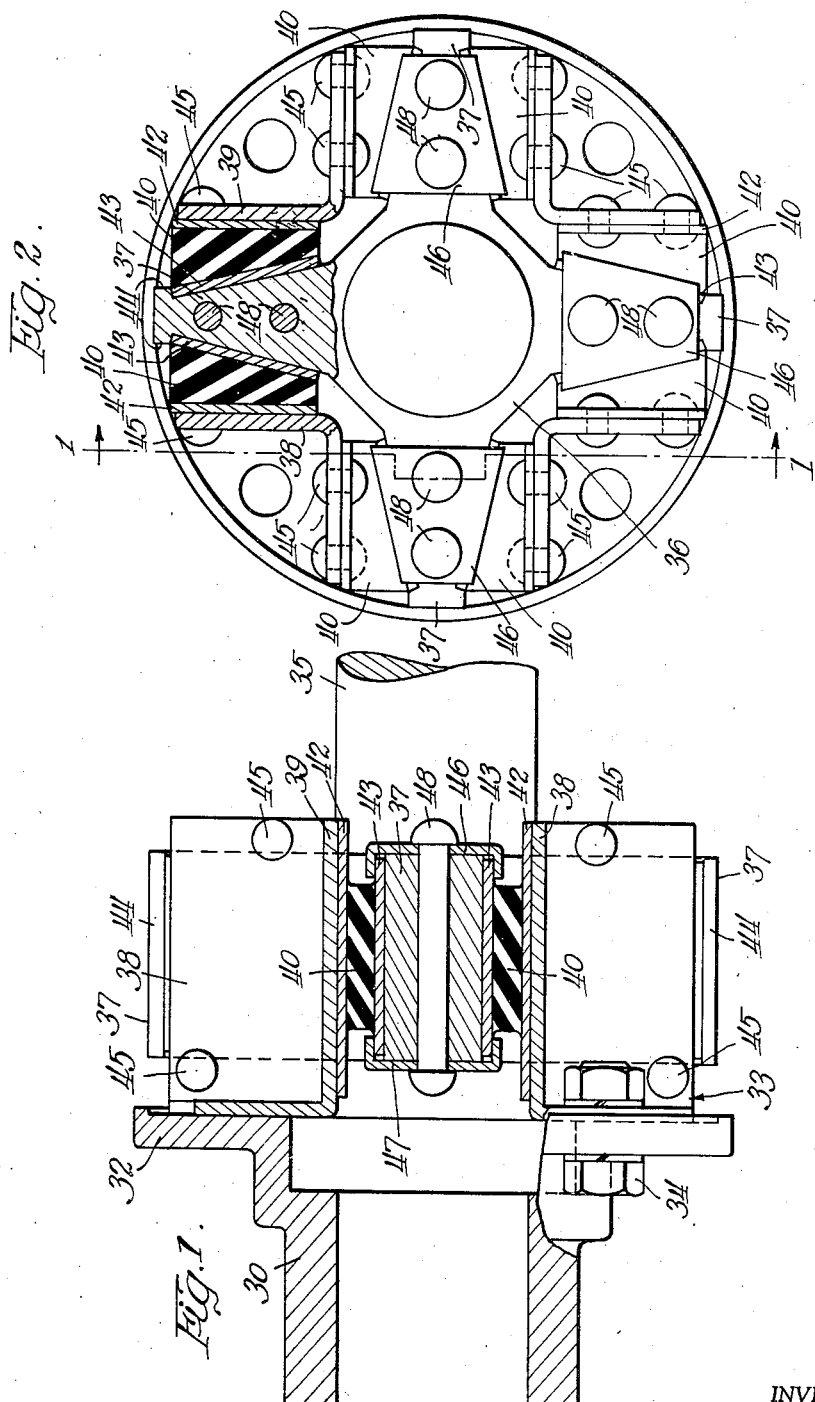
INVENTOR.
Alfred O. Williams.
BY Walter E. Schirmer
ATTORNEY.

Patented Oct. 22, 1940

2,219,142

UNITED STATES PATENT OFFICE 2,219,142

UNIVERSAL JOINT CONSTRUCTION

Alfred O. Williams, Battle Creek, Mich.

Application August 25, 1938, Serial No. 226,671

3 Claims. (Cl. 64—14)

This invention relates to universal joints, and in general concerns itself primarily with universal joints for connecting together shaft sections to transmit torque. Such joints may be used for transmitting drive from a suitable power source to a driving shaft or the like, such as the propeller shaft in a motor vehicle or for transmitting drive from a power unit to an axle of a rail vehicle, or for any other drive transmitting purposes.

One of the primary objects of the present invention is to provide an assembly or joint in which there is no metallic connection between the shaft sections, and they are entirely insulated from each other by rubber, thus preventing transmission of noises or the like through the joint and also providing for a cushioning action in the transmission of torque through the joint.

Basically, I contemplate a universal joint in which rubber is employed as the means by which torque is transmitted from one shaft section to the other, the rubber being under compression for the transmission of torque. However, universal joints are subjected to variations in angularity between the shaft sections, and consequently must be designed to accommodate such misalinement or differences in angularity of the axes of the two shaft sections. The rubber in the joint of the present design is adapted to take care of such misalinement by being arranged in such manner that misalinement produces shear stresses on the same rubber that is employed for transmitting the torque. By this arrangement, the whip or crank action occurring at a universal joint due to misalinement of the shaft section results only in placing the rubber under shear and cannot produce any permanent deformation of the parts or any metallic contact between the two shaft sections.

In the preferred form of the invention the rubber is provided in the form of a wedge-shaped metallically enclosed sandwiches which are positioned between the two portions of the shaft sections forming the joint, and which may be retained in position in any desired manner such as by riveting, bolting or the like. With this arrangement, if the rubber should deteriorate for any reason such as by being subjected to chemical reactions due to the atmosphere in which the joint is employed or because of over-stressing, the sandwiches can be readily removed and new ones substituted therefor without requiring the entire disassembly of the joint.

Other modifications will occur to those skilled in the art, however in all of the forms of the invention which I contemplate, the basic principle of entirely separating the two shaft sections by a rubber member or members which is compressed in order to transmit torque and which is placed in shear stress when the shaft sections become misalined, is employed.

I have found through numerous experiments that rubber in shear stress can withstand much greater distortion, and consequently the design of a joint in which the rubber is stressed in this manner under conditions of misalinement, is of distinct advantage due to the unusual whip action produced in such joints. Also, with the present design of joint, the rubber will be in compression for transmitting torque regardless of the direction of drive, and since such loads are substantially uniform, the uniform compression of the rubber does not in any substantial manner affect its life or resiliency.

Other objects and advantageous features attained by the present invention will be more apparent to those familiar with this art from the following detailed description, and in which reference is made to the accompanying drawing illustrating several forms in which the basic principles of the invention have been employed in the design of the joints.

In the drawing:

Figure 1 is a longitudinal elevational view taken substantially on line 1—1 of Figure 2;

Figure 2 is a transverse elevational view of the joint, partly in vertical section.

In the form of the invention illustrated, one of the shaft sections is provided with the member 30 having the radial flange 32 to which is secured a stamping in the form of a cross and indicated generally at 33. This stamping is preferably secured to the flange 32 by means of the bolts 34. If desired, member 33 may be made as a part of the flange member.

The other shaft section 35 has at its end an arm construction as indicated generally at 36 provided with the four extending arms 37 corresponding to the arms 14 of Figure 2. Each of these arms is therefore disposed substantially centrally within the space defined by the opposite wall portions 38 and 39 of each outwardly directed section of the member 33.

Interposed between the lateral sides of the arms 37 and each of the walls 38 and 39 is a rectangular wedge shaped insert which comprises a resilient body portion 40 preferably formed of rubber, which is vulcanized at opposite lateral surfaces to side plates 42 and 43 formed of thin metallic sheet material. Thus the rubber inserts are integral units in themselves, and are preferably positioned within the spaces between the lateral surfaces of the arms 37 and the walls 38 and 39 by sliding them in a generally axial direction beneath the shoulders 44 formed at the ends of the arms 37. These shoulders 44 engage the upper edges of the plates 43 and thus prevent these plates from outward movement with respect to the arms 37. The opposite plates 42 are preferably riveted at their ends to the walls 38 and 39, it being understood that the plates 42 extend beyond the rubber body portions 40 a sufficient distance to accommodate these rivets. Such rivets are indicated at 45, and thus hold the plates 42 against movement relative to the associated walls 38 and 39. These rubber inserts may or may not be assembled under compression.

By the use of two rivets 45 for each of the plates 42, it is obvious that these plates are retained in fixed position against outward or lateral movement with respect to the walls which they engage.

In order to hold the walls 43 of the rubber inserts against lateral movement, I preferably employ two channel-shaped end pieces 46 and 47 which overlie the radial faces of the arms 37, and which are clamped in position by means of through bolts or rivets 48. It will therefore be apparent that the plates 42 and 43 are rigidly held against either lateral or transverse movement with respect to the walls of the arms 37 or the walls 38 and 39 of the member 33. All torsional stresses in the joint will obviously be accommodated by compression in one or the other of the body members 40 between each of the arms and the member 33, while shear stresses will be produced in the body members 40 when the shaft sections become misalined resulting in a tendency of the arms 37 to move into or out of the slots in the member 33. These shear stresses are transmitted from the plates 43 through the rubber bodies 40 to the plates 42.

However, with this construction, it will be apparent that it is possible to inspect and replace any one of the rubber wedges without requiring disassembly of the joint inasmuch as these are individual members which are inserted into position, and which are not vulcanized to either the members 33 or 36 but are merely locked with respect thereto by the laterally defining metal plates to which the rubber bodies are cemented.

It is therefore believed apparent that I have provided a novel type of universal joint assembly which employs rubber as a cushioning member and insulator between the metallic parts of the joint and in which the rubber is employed in compression for transmission of torque and in shear stress for accommodating misalinement. This results in the construction of a joint having a substantially reduced weight as compared to previous joints with the elimination of any bearing means between the respective joint members and a reduction in the overall diameter of the joint such as to allow its use in places where spacial requirements may be limited.

I am aware that various changes may be made in the details of construction and arrangement of the parts shown in the respective embodiments of the invention selected for illustration herein, and I therefore do not intend to be limited except as defined by the scope and spirit of the appended claims.

I claim:

1. A universal joint comprising a first yoke member having a plurality of radially extending tapering arms, a second yoke member having a plurality of L-shaped arms projecting axially therefrom, the walls of the adjacent arms of said second member being adapted to receive therebetween the arms of said first member, wedge-shaped rubber elements interposed between the first named arms and each of the said walls, metal plates vulcanized to the opposite surfaces of said wedge elements, and means extending through said first named arms for securing the adjacent plates against movement.

2. A universal joint comprising a first yoke member having radially extending arms, a second yoke member having axially directed means projecting therefrom axially overlapping and angularly alternating with said arms to form spaced wall surfaces, a resilient insert interposed in each of the spaces between said wall surfaces, said inserts having metal plates bonded thereto and abuttingly engaging the wall surfaces, and rivet means extending through said arms for locking the adjacent plates thereto.

3. A universal joint comprising a first yoke member having radially extending arms, a second yoke member having axially directed means projecting therefrom axially overlapping and angularly alternating with said arms to form spaced wall surfaces, a resilient insert interposed in each of the spaces between said wall surfaces, said inserts having metal plates bonded thereto and abuttingly engaging the wall surfaces, and means at the axial ends of each arm overlapping adjacent ends of the plates and locking them against axial movement.

ALFRED O. WILLIAMS.